United States Patent
Paluch et al.

(10) Patent No.: US 9,479,594 B2
(45) Date of Patent: Oct. 25, 2016

(54) METHODS AND SYSTEMS FOR PAIRING DEVICES

(71) Applicant: Comcast Cable Communications, LLC, Philadelphia, PA (US)

(72) Inventors: Bryan Paluch, Philadelphia, PA (US); Arpit Mathur, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 491 days.

(21) Appl. No.: 13/827,575

(22) Filed: Mar. 14, 2013

(65) Prior Publication Data

US 2014/0280983 A1  Sep. 18, 2014

(51) Int. Cl.
    *G06F 15/16* (2006.01)
    *H04L 29/08* (2006.01)

(52) U.S. Cl.
    CPC ............ *H04L 67/14* (2013.01); *H04L 67/141* (2013.01); *H04L 67/18* (2013.01)

(58) Field of Classification Search
    CPC .................. H04L 67/14; H04N 21/25841
    USPC ......................................................... 709/227
    See application file for complete search history.

(56) References Cited

U.S. PATENT DOCUMENTS

| | | | |
|---|---|---|---|
| 9,338,495 B2* | 5/2016 | Reams ............ H04N 21/42221 |
| 2006/0011042 A1* | 1/2006 | Brenner et al. ................ 84/600 |
| 2006/0172770 A1* | 8/2006 | Fyke et al. .................... 455/557 |
| 2009/0243932 A1* | 10/2009 | Moshfeghi .................... 342/378 |
| 2010/0102938 A1* | 4/2010 | Delia et al. ................... 340/326 |
| 2010/0165216 A1* | 7/2010 | Beals .................. H04N 5/4403 348/734 |
| 2011/0293095 A1* | 12/2011 | Ben Ayed ..................... 380/270 |
| 2012/0297440 A1* | 11/2012 | Reams ............... H04N 21/4122 725/131 |
| 2013/0040572 A1* | 2/2013 | Berrett et al. ............... 455/41.2 |
| 2013/0057778 A1* | 3/2013 | Hale ................ H04N 21/42207 348/734 |
| 2013/0093962 A1* | 4/2013 | Bruhn .................... G08C 17/02 348/734 |
| 2013/0171939 A1* | 7/2013 | Tian et al. .................. 455/41.2 |
| 2013/0210461 A1* | 8/2013 | Moldavsky et al. ....... 455/456.3 |
| 2014/0007154 A1* | 1/2014 | Seibold et al. ................ 725/25 |
| 2014/0140675 A1* | 5/2014 | de Sa et al. .................. 386/223 |
| 2014/0146644 A1* | 5/2014 | Chen ............................ 367/197 |
| 2014/0267934 A1* | 9/2014 | Hardin ................. H04N 21/654 348/734 |
| 2014/0274031 A1* | 9/2014 | Menendez ................. 455/426.1 |

* cited by examiner

Primary Examiner — Kevin Bates
Assistant Examiner — Clarence McCray
(74) Attorney, Agent, or Firm — Ballard Spahr LLP

(57) ABSTRACT

Disclosed herein are methods and systems for pairing devices such as control devices and user devices, by determining location information relating to one or more of the control devices and the user devices. Location information can be used to identify at least one user device proximate to the control device. The method and system then identifies a selected user device to be paired with the control device. The control device is then paired with the selected user device.

20 Claims, 8 Drawing Sheets

METHODS AND SYSTEMS FOR PAIRING DEVICES

BACKGROUND

Mobile devices may be capable of accessing the Internet, Wireless Fidelity (WiFi) networks, content distribution networks, cellular networks, etc., and, therefore, they may be able to access data such as content from almost any location. However, users often have to go through a tedious authentication process to access content at multiple locations. Furthermore, if a user such as a subscriber desires to allow a guest non-subscriber to access content from the subscriber's account on the guest's mobile device, the subscriber must provide the guest with the account holder's personal authentication or account information. This solution for sharing access to a subscriber's account may pose potential security and identity theft issues. Additionally, various devices, such as mobile devices, can be configured to control user devices, such as, televisions, communication terminals, receivers, and the like. Such "control" devices often have a pre-defined number of inputs or buttons, and can be programmed to enable control of various user devices. Encoded data such as command codes or an index of codes for controlling a user device is typically programmed directly on the control device. However, current solutions for managing device controls are cumbersome, confusing, and do not provide sufficient means for controlling multiple user devices, which may be in various locations, using one or more control devices. These and other shortcomings are addressed by the present disclosure.

SUMMARY

It is to be understood that both the following general description and the following detailed description are exemplary and explanatory only and are not restrictive. Provided are methods and systems for pairing a control device with a user device. In an exemplary embodiment, a location of a control device is determined and at least one user device proximate to the control device is identified. The method and system then identifies from among the at least one user device, a selected user device to be controlled. The control device is then paired with the selected user device.

In another exemplary embodiment, provided are systems for controlling a user device by utilizing a control device that alone or via another device is configured to determine location information. The systems can further comprise a plurality of user devices and a server configured to communicate with user devices and the control device. The server can be further configured to receive the location information of the control device and determine the location of each of the user devices. The control device can then transmit a request to control a user device, and wherein, in response to the request, the server can identify a selected user device to be paired with the control device based at least in part on the location of the control device and the location of the user device.

In still another exemplary embodiment, methods for controlling a user device such as an addressable device are disclosed. The methods can comprise the steps of receiving a request to control a user device from a requestor device. The request can include an indication or identity of the requestor device and an indication of the location of the requestor device. The methods can identify a plurality of user devices proximate to the location of the requestor device. The methods can identify, from the plurality of user devices, a selected user device to be paired with the requestor device. The identifying step can comprise the user device transmitting a video program and identifying the video program from a portion of program data such as related audio. It can be determined which of the plurality of user devices is transmitting the video program and control signals received from the requestor device can be transmitted to the user device determined to have transmitted the video program.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
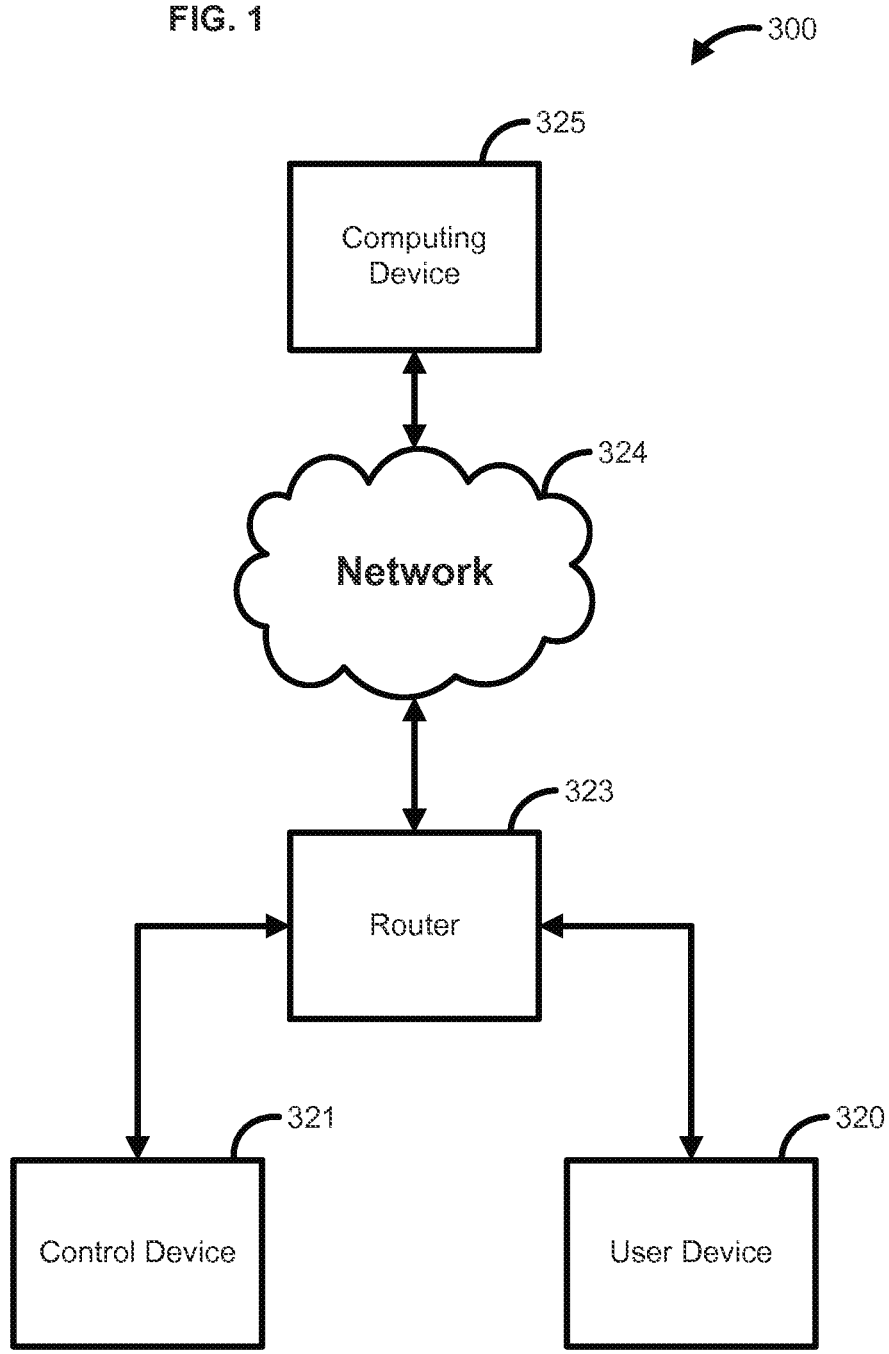
FIG. 1 is a block diagram illustrating an exemplary embodiment of a system for pairing devices in accordance with exemplary methods and systems described herein.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems can take the form of an entirely hardware embodiment, an entirely software embodiment, or an embodiment combining software and hardware aspects. Furthermore, the methods and systems can take the form of a computer program product on a computer-readable storage medium having computer-readable program instructions (e.g., computer software) embodied in the storage medium. More particularly, the present methods and systems can take the form of web-implemented computer software. Any suitable computer-readable storage medium can be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a mach e, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates an exemplary embodiment of a system 300 for pairing devices in accordance with the methods and systems described herein. In an exemplary embodiment, the system can comprise a computing device, such as a server computer 325 in communication with a network 324. The system 300 can also comprise a user device 320 and a control device 321 that communicates with the server 325 via a router 323. The computing device 325 can include any general computing device; however, in an exemplary embodiment computing device 325 can be a server 325 such as the computer 201 of FIG. 2. In an exemplary embodiment, the server 325 can be configured to communicate with both the user device 320 and the control device 321. The server 325 can be further configured to determine location information describing the location of the control device 321 and to determine and/or receive the location of each of the user devices 320 over the network 324. Control device 321 may also be called a requestor device, and the user device 320 may also be called an addressable device.

FIG. 1 further illustrates a network 324. The network 324 can be the Internet, a wireless fidelity (WiFi) network, a. Bluetooth network, an ultra-wide band (UWB) network, cellular, local-area-network (LAN), wide-area-network (WAN), and the like as described in herein. The network 324 can be any combination of wired or wireless networks that allows the server 325, control device 321 and user device 320 to bi-directionally communicate with each other.

A network switch or router 323 can be used to connect the server 325 and network 324 to the control device 321 and/or the user device 320. The router 323 can serve as a controller, enabling these networked devices to communicate with each other efficiently. The router links computing devices such the control device 321 and/or user device 320 to the network 324 so that users can share the connection while allowing each of the devices to communicate with each other and with the server 325.

The user device 320 can comprise a computing device that receives interactive programming and content over a network. The programming and content can be displayed on a subscriber's television, audio receiver device, computer, monitor, and the like. The user device 320 can be a set top box (STB) attached to a television (TV) for receiving cable network TV programming. However the user device 320 can also be a digital cable card device, digital television, WebTV client, video game device, digital video disk (DVD) player, digital television streaming device, entertainment computer, and the like. The user device 320 can comprise a tuner and can connect to both a television and an external signal source. In an exemplary embodiment, the user device 320 can comprise a combination of both a STB and an audio/ video user device, such as an audio receiver device, speakers and/or television. The signal source can be one or more of: an Ethernet cable, a connection to a satellite dish, a coaxial cable, a telephone line (including DSL connections), Internet protocol television networks (WIN), broadband over power lines (BPL), or VHF, UHF or digital broadcast antenna. In an exemplary embodiment, the signal source can be a connection to a distributed content delivery system. The content and/or programming can comprise any or all of video, audio, Internet web pages, Internet streaming content, interactive video games, interactive application programs, and the like. In an exemplary embodiment, the user device 320 can receive various content distributed over the content delivery system and render the content.

In an exemplary embodiment, the control device 321 can be a mobile computing device such as a smart phone, portable computer, tablet computer, mp3 player, GPS device, and the like. The control device 321 can be capable of connecting to a network 324. The control device 321 can be configured to provide second screen content relating to content provided via the user device 320. As an example, the control device 321 can be configured to issue control commands for controlling devices such as the user device 320.

In an exemplary embodiment, the system 300 can use the location of the control device 321 to implement the methods discussed herein. Location information for the control device 321 can be determined by a variety of methods including using the address or account information of the network subscriber, network metadata stored in the system memory of the device, and/or information derived from GPS, signal triangulation or other location sensors within the control device 321. Other sensors such as microphones, cameras, gyroscopes, touch screen inputs, buttons, keyboards, light sensors, and the like can also be found in the control device 321. Similarly, the control device 321 can also contain radio transceivers for cellular, WiFi, Bluetooth, ultra-wide band (UWB), near field communications (NFC), and the like.

The sensors and transceivers allow the control device 321 to receive and/or sense location information, as well as audio, video and/or other signals in the control device 321. For example, the sensor in the control device 321 can be a microphone that listens for ambient audio signals. Once the control device 321 has sampled a sufficient audio signal for analysis using a microphone, the control device 321 can use a WiFi transceiver to transmit at least a portion of the received audio signal to the server 325 via the network 324. In an exemplary embodiment, described in further detailed in the discussion of FIGS. 3-6 herein, the server 325 can communicate and send data to and from both the control device 321 and the user device 320 via the network 324. In an exemplary embodiment, the control device 321 can include a mobile phone, smart phone, laptop or tablet computer that can execute an application program that uses internet, Bluetooth, triangulation methods and other means to determine the location of the control device 321 and transmit the location of the control device to the server 325.

In an exemplary embodiment, the control device 321 can comprise computing resources executing an application program connecting to the server 325 and the user device 320. Similarly, both the server 325 and the user device 320 can comprise computing resources for executing applications for implementing the respective pairing methods described in the discussion of FIGS. 3-6 herein. Once the control device 321 is paired to a user device 320, the control device 321 can receive content from the server 325.

Figure 2:
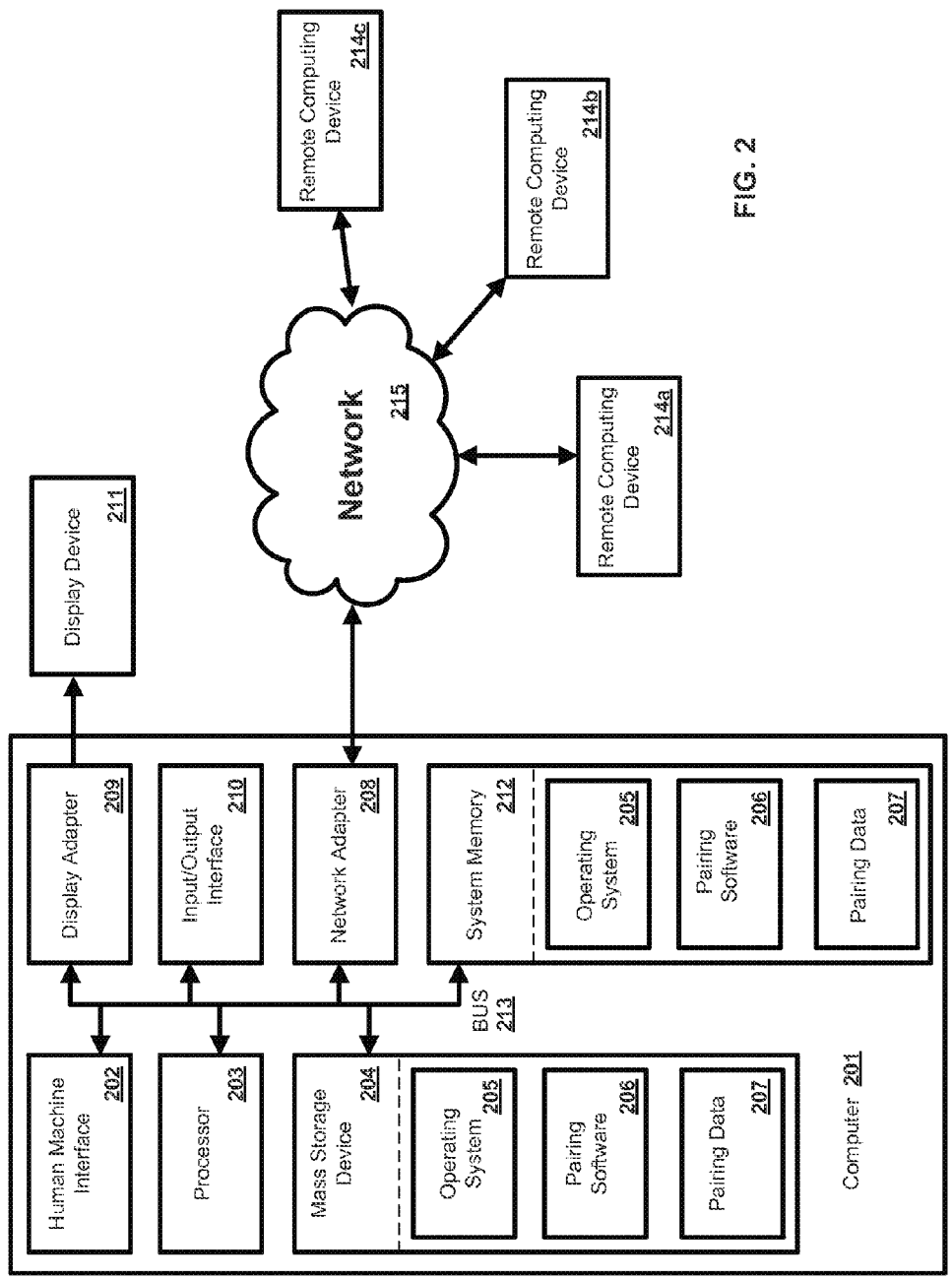
FIG. 2 is a block diagram illustrating an exemplary embodiment of a computer system and network environment in which the methods and systems described herein can operate.

In an exemplary aspect, the methods and systems can be implemented on a computer 201 as illustrated in FIG. 2 and described herein. By way of example, computing device 110 of FIG. 1 can be a computer as illustrated in FIG. 2. Similarly, the methods and systems disclosed can utilize one or more computers to perform one or more functions in one or more locations. FIG. 2 is a block diagram illustrating an exemplary computer system for performing the disclosed system and methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods include, but are not limited to personal computers, server computers, laptop devices, tablet devices, mobile/smart phone devices and multiprocessor systems. Additional examples include set top boxes, programmable consumer electronics, network PCs, minicomputers, mainframe computers, distributed computing environments that include any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 may include, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures eau include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and buses specified in this description can also be implemented over a wired or wireless network connection and each of the subsystems, including the processor 203, a mass storage device 204, an operating system 205, pairing software 206, pairing data. 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically includes a variety of computer readable media. Exemplary readable media can be any available media that is accessible by the computer 201 and includes, for example and not meant to be limiting, both volatile and non-volatile media, removable and non-removable media. The system memory 212 includes computer readable media in the form of volatile memory, such as random access memory (RAM), and/or non-volatile memory, such as read only memory (ROM). The system memory 212 typically contains data such as pairing data 207 and/or program modules such as operating system 205 and pairing software 206 that are immediately accessible to and/or are presently operated on by the processing unit 203.

In another aspect, the computer 201 can also include other removable/non-removable, volatile/non-volatile computer storage media. By way of example, FIG. 2 illustrates a mass storage device 204, which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and pairing software 206. Each of the operating system 205 and pairing software 206 (or some combination thereof) can include elements of the programming and the pairing software 206. Pairing data 207 can also be stored on the mass storage device 204. Pairing data 207 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices include, but are not limited to, a keyboard, pointing device (e.g., a "mouse"), a microphone, a joystick, a scanner, tactile input devices such as touch screens, gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can include components such as speakers (not shown) and a printer (not shown), which can be connected to the computer 201 via Input/Output interface 210. Any step and/or result of the methods can be output in any form to a user device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing or user device can be a personal computer, portable computer, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of pairing software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can include "computer storage media" and "communications media." "Computer storage media" may include volatile and non-volatile, removable and non-removable media implemented in any methods or technology for storage of information such as computer readable instructions, data structures, program modules, or other data. Exemplary computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
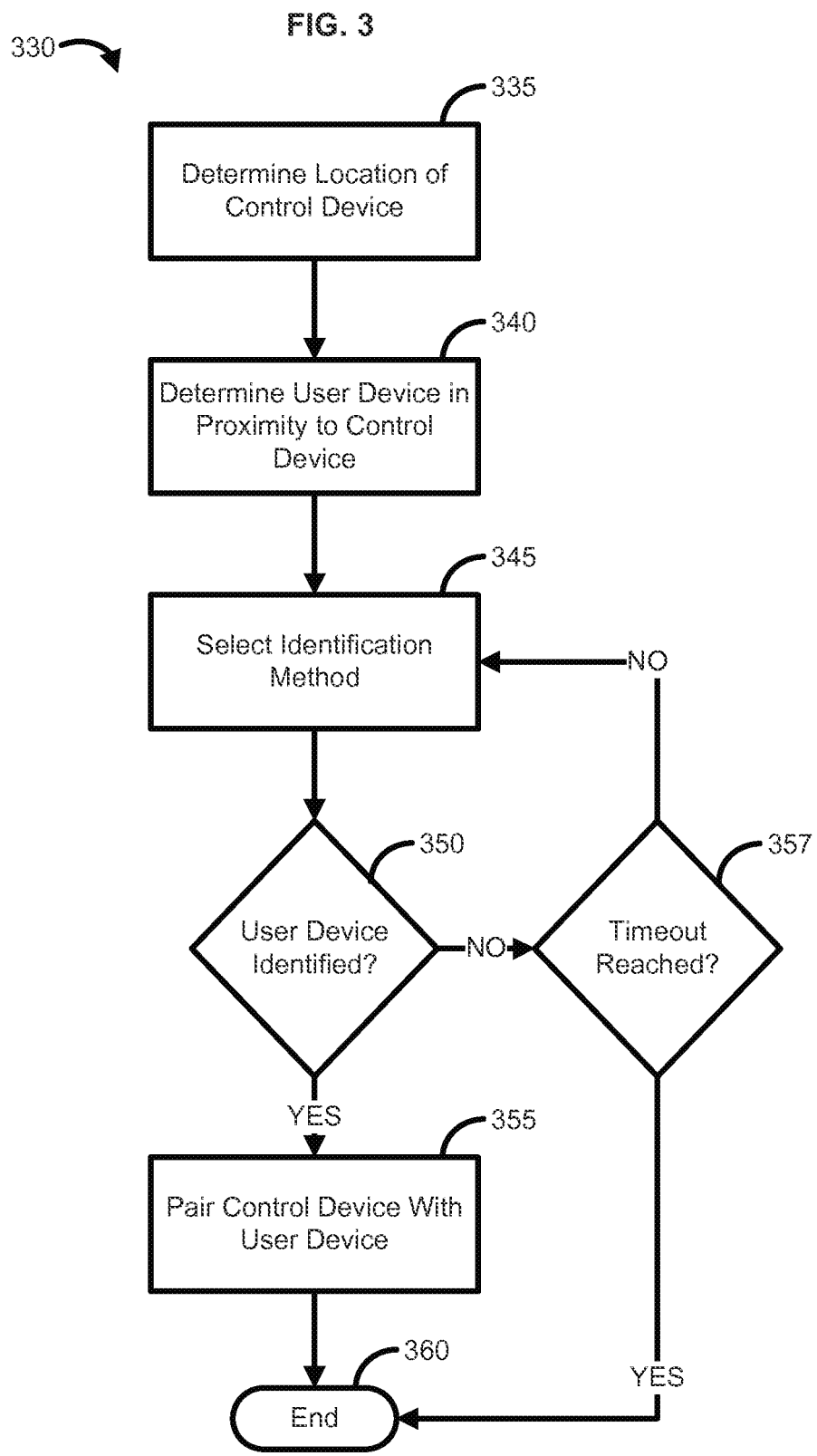
FIG. 3 is a flow chart illustrating an exemplary embodiment of a method for pairing devices in accordance with exemplary methods and systems described herein.

Turning now to FIG. 3, a flow chart illustrating an exemplary method 330 for pairing a first device such as control device 321 with a user device 320 in accordance with the present disclosure is shown. The method 330 starts when the control device 321 transmits a request to control a user device 320 to the server 325 via the network 324. In an exemplary embodiment, the request can comprise an indication of the identity and location of the control device 321. In response to the request, the server 325 can attempt to identify one or more user devices 320 in proximity to the control device 321 for pairing. The server 325 can attempt to determine the location of the control device 321 and/or a specific user device 320 in proximity to the control device 321 so the intended devices can be paired. The location of the control device 321 can be determined at step 335 as described herein.

In step 335, the location of the control device 321 can be provided to the server 325. The location of the control device 321 can be determined by a variety of methods, including inputting location information, using the address or account information of a user subscriber, an Internet protocol (IP) address of the network interface, network metadata stored in the system memory of the device, and/or information derived from GPS sensors within the control device 321, and the like. Once the location of the control device 321 is determined, the method proceeds to step 340.

At step 340, the method can identify at least one user device 320 in proximity to the control device 321. In an exemplary embodiment, the location of the user device 320 can be identified using the methods described herein, including for example, GPS sensors within the user device 320. In a further exemplary embodiment, the server 325 can store registered address locations for user devices 320 in a user device location database. The method of identifying at least one user device 320 in proximity to the control device 321 can also involve searching the user device location database using registered address locations within a predetermined distance of the control device 321. In an exemplary embodiment, the location of a user device 320 can also be determined using one of the methods 665*a-c* illustrated in FIGS. 4-6 and described herein. In a further exemplary embodiment, location information can be stored in a user device location database connected to the server 325 for future use. The method proceeds to step 345 to select an identification method for identifying the specific user device 320, (e.g., determine if the location of the specific user device 320 in proximity to the control device 321 is readily available or if there are multiple user devices 320 in proximity to the control device 321.

At step 345 the method can select from a plurality of identification methods, such as methods 665*a*-665*c*, to attempt to identify a specific user device 320 in proximity to the control device 321. In another exemplary embodiment, one or any combination of methods can be used to identify a user device 320 in proximity to a control device 321. In a further exemplary embodiment, if the identification method has previously attempted to identify the user device 320 using one of the identification methods 665*a*-665*c*, the selection at 345 may select a different method or combination of methods from the identification methods 665*a*-665*c*. Three identification methods are presented, and described herein. However, these are exemplary methods and any number of other methods can be used, such as a manual method where the user selects each device to be paired. Once the identification method for determining the specific user device 320 in proximity to the control device 321 is selected, the method proceeds to step 350.

At step 350, the selected identification method can attempt to identify a specific user device 320 for pairing with the control device 321. In an exemplary embodiment, the server 325 can be in communication with both the control device 321 and one or more user devices 320, and can present the user with a selection of user devices 320 the server 320 determines to be in proximity with the control device 321. The user can select the user device 320 deemed closest or a preferred user device 320 of the user's choosing.

In an alternative embodiment, the identification attempt can occur automatically. For example, if the user device 320 has previously been paired, unique identifiers can be used to allow a control device 321 to be automatically authenticated when in proximity to the user device 320. In another exemplary embodiment, if there is only one user device 320 in proximity to one control device 321, the identification of the user device 320 can be automatic. If the method fails to identify a user device 320 the method can proceed to step 357.

At step 357 the method can determine if a number of identification attempts have been made or if a timeout period has elapsed. If the user device 320 cannot be identified after the predetermined number of attempts or time limit has been reached and/or if there is some other fault in the system, the user can be notified that the user device 320 cannot be identified and the method can terminate by proceeding to step 360. If the predetermined number of attempts or the time limit has not been reached, the method can return to step 345 and use a different method 665, or combination of methods.

If the user device 320 can be identified, then the method can proceed to step 355. At step 355, the user device 320 can be paired with the control device 321, so that the control device 321 can receive and control subscribed content either from the user device 320, server 325, or both.

In an exemplary embodiment, the method of pairing the control device 321 with the selected user device 320 can utilize applications executing on the control device 321 to request permission to allow the control device 321 to control the user device 320. If permission is granted, the control device 321 can be paired with the selected user device 320. In another exemplary embodiment, the server 325 can be configured to identify a control device 321 previously authorized to control the selected user device 320. Once the control device 321 is paired with the user device 320, the control device 321 can be used to control the user device and/or receive audio, video, and other content from the user device 320 or server 325. In an exemplary embodiment, the control device 321 can communicate with the user device 320 via any of the network methods described herein. In an exemplary embodiment, pairing the control device 321 with the specific user device 320 can permit one or more of: (1) mirroring the output of the user device on the control device; (2) transmitting audio from the user device to the control device; (3) transmitting video from the user device to the control device; and (4) controlling the user device with the control device. Once the control device 321 has been paired with a specific user device 320 the method for pairing can terminate at step 360.

Figure 4:
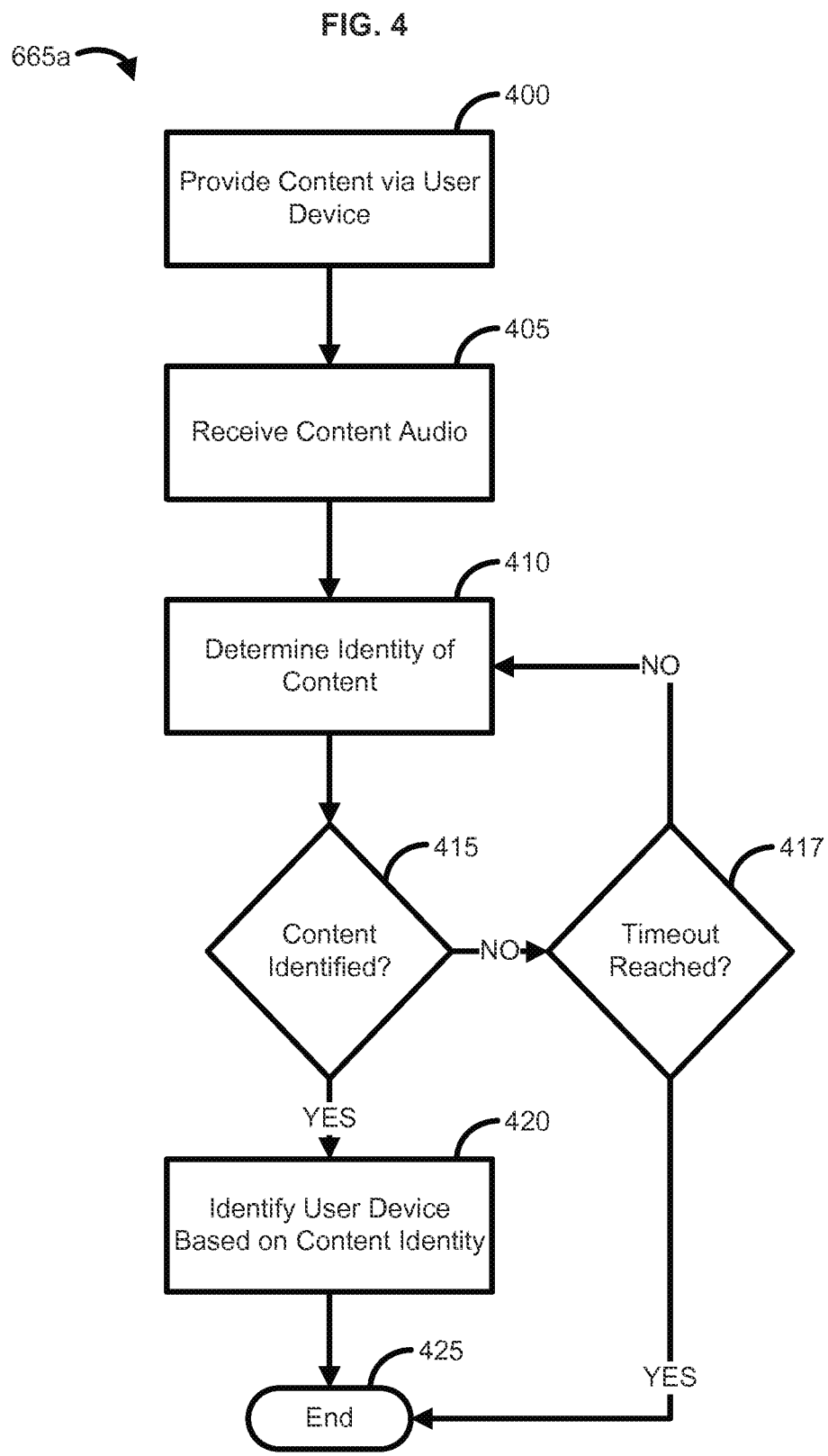
FIG. 4 is a flow chart illustrating an exemplary embodiment of a method for identifying a user device.

FIG. 4 is a flow chart illustrating an exemplary embodiment of a method 665*a* for identifying a selected user device 320 using a signal from content presently rendered in accordance with the present disclosure. The signal can comprise one or more of an audio signal or a visual signal. The method can comprise rendering audio, video, an audio/video program, a television program, and the like on a user device 320 in step 400. In an exemplary embodiment, the user device 320 can be configured to receive and/or render a content audio signal. A content audio signal can be any audio signal that is associated with content currently being rendered. By way of example, a content audio signal can be extracted from any content being rendered through speakers or directly through an audio receiver. The server 325 can distribute content to the user device 320 and can maintain a database of the content that is actively being rendered via user devices 320.

At step 405 a device such as control device 321 can receive the content audio signal. In an exemplary embodiment, the control device 321 can execute an application to pair with the user device 320. During the pairing process, the application can prompt the user to allow the control device 321 to listen to the content audio signal currently emitted by the user device 320. For example, the control device 321 can comprise a microphone that listens to ambient content audio signals and samples the content audio signals for analysis. Once the control device 321 has received and stored a content audio signal sample for analysis, the control device 321 can transmit the content audio signal sample to the server 325. A content audio signal sample can comprise a recorded portion of a content audio signal, for example, the content audio signal sample can comprise anywhere from 1-60 seconds of the content audio signal. Once the content audio signal sample is transmitted to the server 325, the method proceeds to step 410.

In step 410, the server 325 can receive the content audio signal sample and analyze the content audio signal sample to identify the content associated with the content audio signal. In an exemplary embodiment, the server 325 can compare the content audio signal sample with a database of known audio signals associated with specific content. The server 325 can thus determine the identity and source of the content audio signal sample. For example, the received content audio signal samples can be compared and/or matched with audio portions of television programs stored in a database of the server 325 to determine which television program the content audio signal sample is derived from and use such information to determine which user device 320 the audio signal originated from. Once the source of the content audio signal sample is determined and matched to content, the method proceeds to step 415.

A determination can be made at step 415 as to whether the received content audio signal sample has been identified. If the content audio signal sample has been identified and related to content, the method can proceed to step 420. However, if the method was unable to identity the content associated with the content audio signal sample within a selected time period or within a number of attempts, then the method can return to step 400 via step 417, and steps 400 through 410 can be repeated. The method can attempt to identify the source of the content audio signal sample for a predetermined number of attempts or a predetermined amount of time at step 417.

At step 417 the method can make a predetermined number of attempts and/or can attempt to identify content associated with the content audio signal sample for a predetermined amount of time. However, if the content associated with the content audio signal sample cannot be identified after the predetermined time or the number of attempts has been reached, the method 665*a* can terminate by proceeding to step 425. In an aspect, a different method 665*a-c* can be implemented.

However, if at step 415, the content audio signal sample is matched to content stored in the database of the server 325, then the method proceeds to step 420. At step 420 the method can identify the user device 320 that produced the content audio signal sample received by the control device 321. In an exemplary embodiment, the method can compare the identity of the content with a database of user devices 320, in proximity to the location of the control device 321, that are known to be playing the identified content. The server 325 can match the content to a particular user device 320 currently playing the identified content in the vicinity of the control device 321. Thus, the specific user device 320 can be identified based on the combination of the content originating from the user device 320 and the known location of the control device 321 attempting to pair with it.

Figure 5:
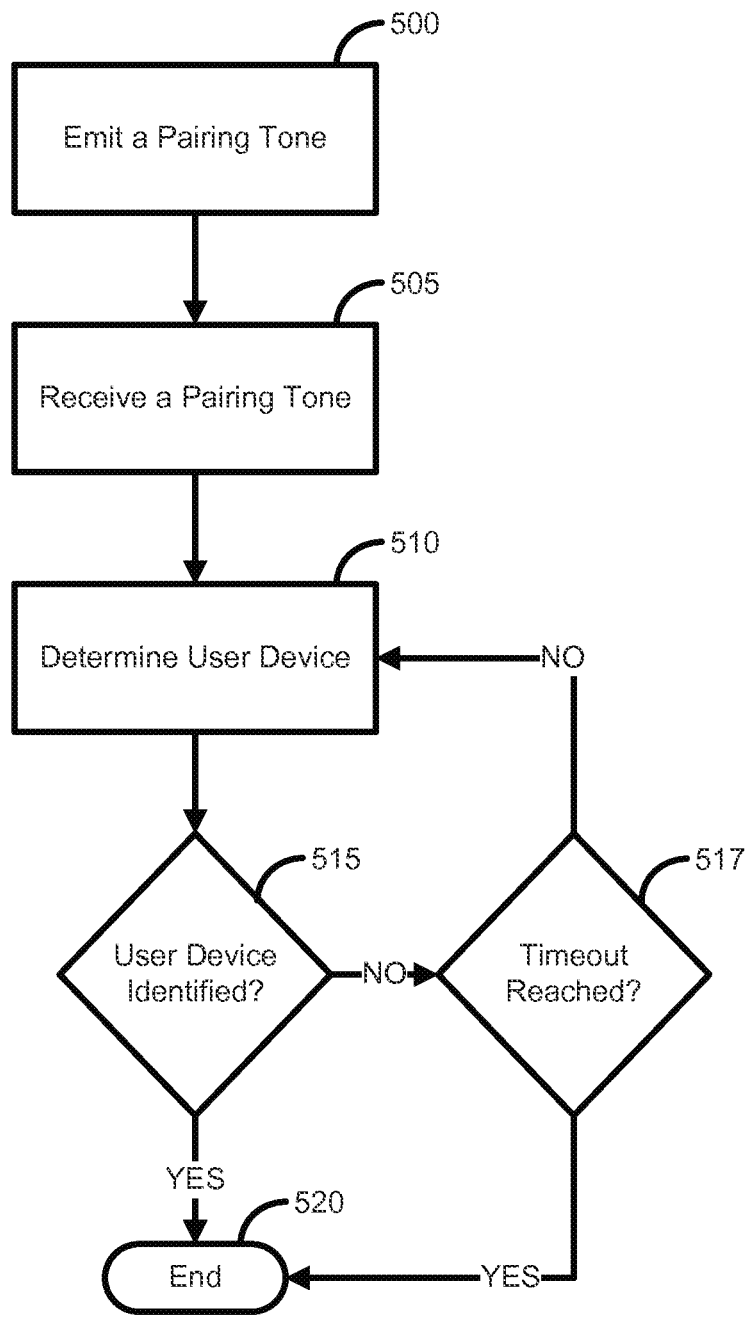
FIG. 5 is a flow chart illustrating an exemplary embodiment of a method for identifying a user device.

FIG. 5 illustrates an embodiment of a method 665*b* for identifying a user device using a pairing tone. The method can comprise emitting a pairing tone at a specific frequency from a user device 320 in step 500 wherein the pairing tone is received by a device such as the control device 321 and transmitted to the server 325. The pairing tone can be emitted having a specific frequency that can be analyzed, searched, and compared using a tone-pairing database on the server 325. The tone-pairing database on the server can associate the pairing tone with a specific user device. In an exemplary embodiment, the emitted pairing tone can be generated at the user device 320. Identifying information can be associated with the specific user device 320 that emitted the pairing tone and this information can be stored in the tone-pairing database on the server 325. In another exemplary embodiment, the server 325 can identify a plurality of user devices in proximity to the control device 321 and send a different pairing tone to each of the user devices 320. The control device 321 can be configured to receive the pairing tone that is from the user device 320 that is in closest proximity.

In an exemplary embodiment, the user device 320 can be connected to a television and/or audio receiver device with speakers that emit the pairing tone. In another exemplary embodiment, the pairing tones can be emitted at a frequency that is out of the aural range of human hearing, such that autonomous pairing can take place without disturbing the user or interrupting content being rendered on the user device 320. In yet another exemplary embodiment, the pairing tones can be emitted within the aural range of human hearing, such that users can manually pair the control device 321 with the appropriate user device 320. The pairing tone can be emitted as a single tone, a series of tones, or a specific pattern of various tones and/or sounds. Once the pairing tone is emitted, the method proceeds to step 505.

In step 505, the control device 321 can initiate pairing with the user device 320. The control device 321 can listen for and receive the pairing tone. In an exemplary embodiment, the control device 321 can prompt the server 325 to activate the pairing tone on user devices 320 in proximity to the control device 321 so that the control device 321 knows when to detect the pairing tone. In a further embodiment, the control device 325 can prompt the user when the control device 325 has received the emitted pairing tone and when the control device 325 has transmitted the pairing tone to the server 325. Once the pairing tone has been received and transmitted to the server 325, the method proceeds to step 510.

In step 510, the method can attempt to determine the identity of the user device 320 that emitted the pairing tone received at the control device 321. In an exemplary embodiment, the server 325 can be configured to compare the received pairing tone, having a specific frequency, to tones of varying frequencies stored in the tone-pairing database. The tone-pairing database can be located in the server 325 of the system 300 in FIG. 1. In an alternative embodiment, control device 321 can receive the pairing tone, analyze the pairing tone, and access the tone-pairing database to identify the user device 320 that emitted the pairing tone. If the user device 320 is identified, the control device 321 can update and instruct the server 325 or the user device 320 to proceed with pairing. In an exemplary embodiment, the pairing tones can be linked to a specific user device 320 listed in the database of the server 325. This allows the received pairing tones to be compared and/or matched with the tones of varying frequencies stored in the database to identify which user device 320 emitted the tone. Thus, a specific user device 320 can be identified based on the pairing tone of the frequency originating from the user device 320. The method proceeds to step 515 to determine if the user device 320 has been identified.

At step 515, if the received pairing tone has not been matched to a user device 320 stored in the database of the server 325, then the method returns to step 500, wherein steps 500 through 510 can be repeated. At step 517, the method can make a predetermined number of attempts to identify a pairing tone. However, if the pairing tone cannot be identified after the predetermined number of attempts has been reached and/or if the emitted tone is indecipherable, the identification method 665b can terminate at 520 and another method of matching the user device 320 to a control device 321 can be selected. However, if the received pairing tone is matched to a tone in the tone-pairing database of the server 325, then user device 320 that emitted the pairing tone can be identified and the identification method can terminate at 520.

Although the output identification method 665b has been described in terms of an audio tone, similar methods wherein the audio tone is replaced with a bar code, quick response code (QRC), or other visual indicator can be used in place of the tone. The visual indicator can be displayed on a television or monitor attached the user device 320 and received on the control device 321 using a still or video camera. Similar methods as described in steps 500-520 herein can be employed such that the visual indicator can be used to determine the location of the user device 320. Once the selected user device 320 is identified, the method proceeds on step 350 of the method for pairing a control device 321 with a user device 320.

Figure 6:
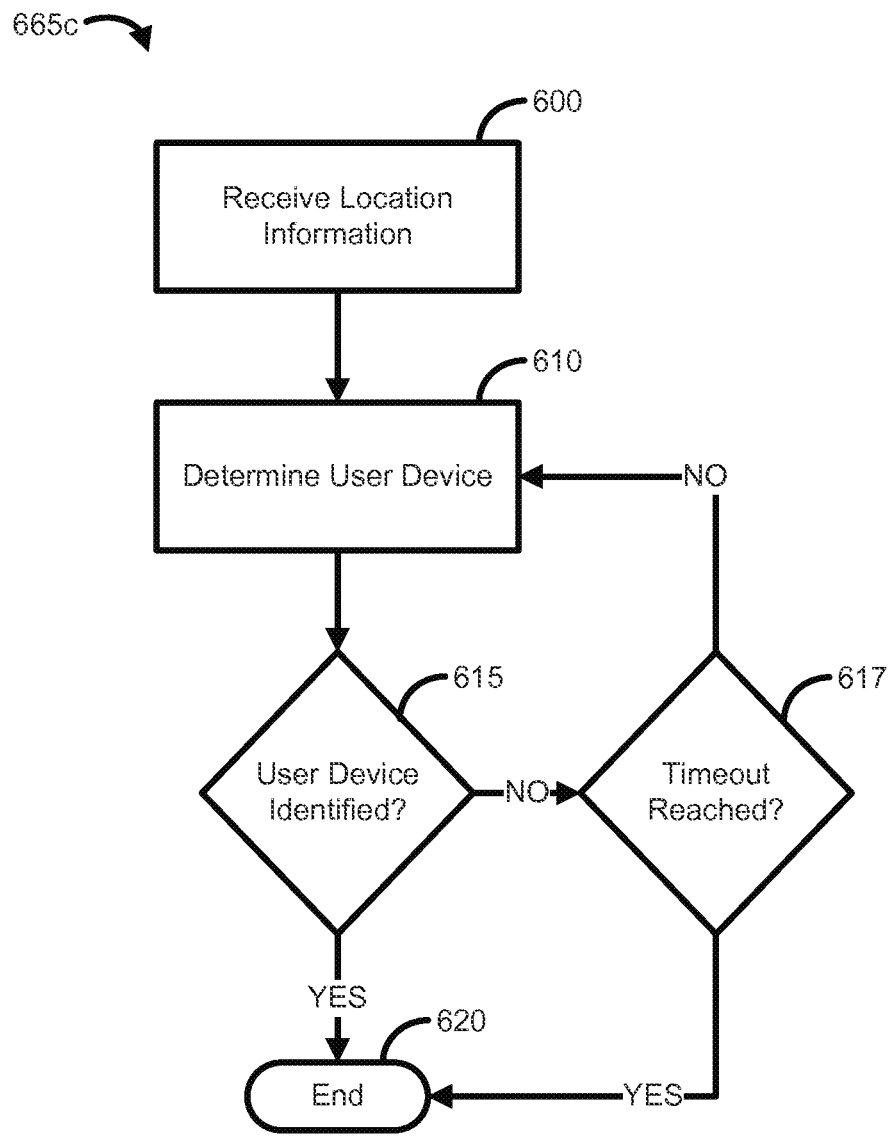
FIG. 6 is a flow chart illustrating exemplary embodiment of a method for identifying a user device.

FIG. 6 illustrates a third embodiment of a method 665c for identifying a user device using a GPS signal. The method can comprise receiving location information from a global positioning system receiver associated with one or more user devices 320 in step 600. In an exemplary embodiment, the control device 321 can receive GPS signals to determine the location of control device 321. In another exemplary embodiment, the user device 320 can use subscriber authentication information associated with the user device 320 to determine the location of the control device 321. For example, a database at the server 325 can be linked to the subscriber's account information having the subscriber's home address information where the control device 321 is located. In some instances the home address of the subscriber can be used to predict the location of the control device 321. However, if the address is a multi-unit apartment building, for example, more specific location information could be useful. This location information can be obtained from GPS signals received at the user device 320 and/or the control device 321. Once the location of both the user device 320 and the control device 321 are known, the method then proceeds to step 610.

At step 610, the location of both the user devices 320 and the control device 321 are known. With this location information, the method can attempt to identify the user device 320 that is closest to a user's control device 321. At step 615 if the method cannot identify a specific user device 320 as being closest to the control device 321, then the method can proceed to step 517 to determine whether a predetermined number of attempts has been exceeded or a time limit has been exceeded. If either the number of attempts or the time limit has been exceeded, then method 665c can terminate at 620 and another method of identifying the user device 320 can be selected. If the number of attempts or the time limit has not been exceeded the method can attempt to identify the user device 320 again. However, if a specific user device 320 is identified as being closest to the user's control device 321, then the selected user device 320 can be identified and the identification method 665c can terminate at 620.

The steps illustrated in user device identification methods 665a-c can be used individually or in any combination to obtain the location of the user device 320. Each method can be an alternative for the other user device identification methods. In a multi-unit apartment building where there are several user devices 320 in proximity to each other, a combination of user device identification methods 665a-c can be used to more specifically identify the specific user device 320. User device identification methods 665a-c are exemplary methods for identifying the location the user device 320. However, various other location methods can also be used to determine the location of the user device 320.

Figure 7:
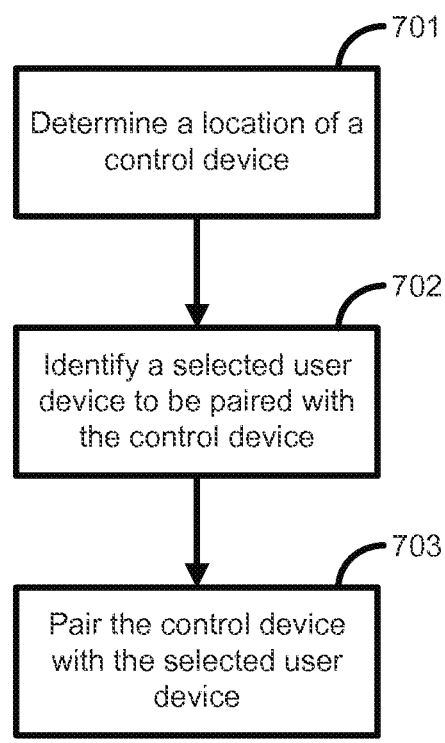
FIG. 7 is a flow chart illustrating an exemplary embodiment of a method for pairing devices in accordance with exemplary methods and systems described herein.

In an aspect, illustrated in FIG. 7, provided are methods for pairing device such as a control device with a user device. One method, for example, can comprise determining a location of a control device at 701 and identifying at least one user device proximate to the control device at 702. The method can further comprise identifying; from among the at least one user device, a selected user device to be paired with the control device at 703 and pairing the control device with the selected user device at 704.

In an aspect, the user device can comprise a set top box. The user device can comprise a computing device that receives interactive programming and content over a network. The user device can be a set top box (STB) attached to a television (TV) for receiving cable network TV programming. In a further aspect, the user device can be a digital cable card device, digital television, WebTV client; video game device, digital video disk (DVD) player, digital television streaming device, entertainment computer, and the like as described herein. The user device can comprise a tuner and can connect to both a television and an external signal source. In an exemplary embodiment, the user device can comprise a combination of both a STB and/or an audio/video device such as an audio receiver device, speakers and/or television. In an aspect, the control device can comprise a mobile device. The control device can comprise a global positioning system receiver, and wherein locating the control device comprises receiving location information from the global positioning system receiver. In an exemplary embodiment, the control device can be a mobile computing device such as a smart phone, portable computer, tablet computer, mp3 player, GPS device, and the like.

In an aspect, the step of identifying the selected user device can comprise the steps of: playing, with the user device, a program; receiving, with the control device, audio associated with the program; determining, based on the audio associated with the program, the identity of the program; and determining, based on the identity of the program, the user device playing the program, said user device comprising the selected user device. The step of identifying the selected user device can comprise the steps of: transmitting, from each user device, a tone, wherein each user device transmits atone at a different frequency from each other user device; receiving one of the tones at the control device; and determining, based on the frequency of the received tone, the user device that transmitted the received tone, wherein the user device that transmitted the received tone comprises the selected user device.

In a further aspect, the step of identifying the selected user device can comprise one or more of; receiving location information from a global positioning system receiver associated with each user device; and determining, based on the location information, the user device that is closest to the control device, wherein the user device that is closest to the control device comprises the selected user device. The step of identifying at least one user device proximate to the control device can comprise searching a database of user device locations for locations within a predetermined distance of the control device.

The step of pairing the control device with the selected user device can comprise at least one of mirroring the output of the user device on the control device, transmitting audio from the user device to the control device, transmitting video from the user device to the control device, and controlling the user device with the control device. The step of pairing the control device with the selected user device can comprise the steps of: requesting permission to allow the control device to control the user device, and pairing the control device with the selected user device in response to receiving permission.

Figure 8:
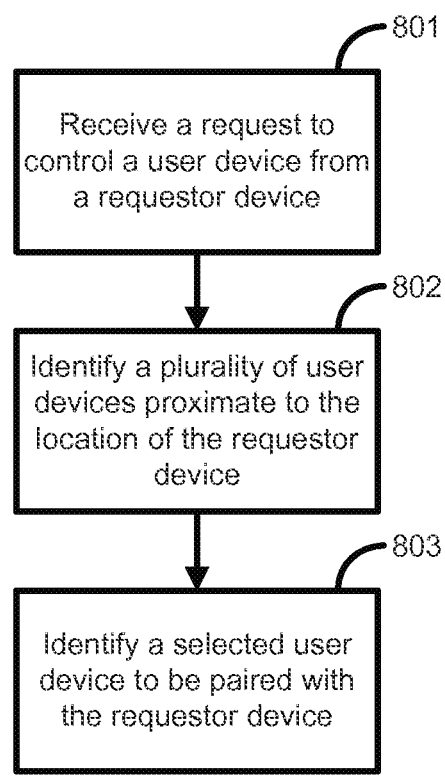
FIG. 8 is a flow chart illustrating an exemplary embodiment of a method for pairing devices in accordance with exemplary methods and systems described herein.

In a further aspect, illustrated in FIG. 8, provided are methods for controlling a user device. One method, for example, can comprise receiving a request to control a user device from a requestor device, at 801. The request can comprise an indication of the identity of the requestor device and an indication of the location of the requestor device. The method can further comprise identifying a plurality of user devices proximate to the location of the requestor device, at 802. The method can further comprise identifying, from the plurality of user devices, a selected user device to be paired with the requestor device, at 803. In an aspect, the identifying step can comprise one or more of causing a signal to be transmitted from the user device, identifying content from a portion of the signal, determining which of the plurality of user devices is transmitting the content, and accepting control signals from the requestor device.

In an aspect, the user device can be a content device such as a set top box, second screen device, output device, video device, and the like. The user device can comprise a computing device that receives interactive programming and content over a network. The user device can be a set top box (STB) attached to a television (TV) for receiving cable network TV programming. In a further aspect, the user device can be a digital cable card device, digital television, WebTV client, video game device, digital video disk (DVD) player, digital television streaming device, entertainment computer, and the like as described herein. The user device can comprise a tuner and can connect to both a television and an external signal source. In an exemplary embodiment, the user device can comprise a combination of both a STB and an audio/video user device such as an audio receiver device, speakers and/or television. In an aspect, the requestor device can be a control device such as a mobile device or second screen device. The control device can comprise a global positioning system receiver, and wherein locating the control device comprises receiving location information from the global positioning system receiver. In an exemplary embodiment, the control device can be a mobile computing device such as a smart phone, portable computer, tablet computer, mp3 player, GPS device, and the like.

The signal can comprise an audio signal, a visual signal, a combination and/or portion thereof. The content can comprise any or all of video, audio, Internet web pages, Internet streaming content, interactive video games, interactive application programs, and the like.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: miters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining a location of a control device;
    identifying at least two user devices proximate to the control device;
    causing a signal to be transmitted from each of the at least two identified proximate user devices, wherein each of the at least two identified proximate user devices transmits at a different frequency from the others of the at least two identified proximate user devices;
    selecting, from among the at least two identified proximate user devices, a user device to be paired with the control device based on the frequencies of the transmitted signals; and
    causing the control device to be paired with the selected user device.

2. The method of claim 1; wherein the control device comprises a second screen device.

3. The method of claim 1, wherein the control device comprises a mobile device.

4. The method of claim 1, wherein the step of selecting the user device comprises the steps of:
    playing, with the user device, a program;
    receiving, with the control device, audio associated with the program;
    determining, based on the audio associated with the program; an identity of the program; and
    determining, based on the identity of the program, the user device playing the program as the selected user device.

5. The method of claim 1, wherein the step of selecting the user device comprises the steps of:
    transmitting, by each user device, a tone, wherein each user device transmits a tone at a different frequency from each other user device;
    receiving one of the tones at the control device; and determining, based on the frequency of the received tone, the user device that transmitted the received tone, wherein the user device that transmitted the received tone becomes the selected user device.

6. The method of claim 1, wherein the step of selecting the user device comprises the steps of:
receiving location information from a global positioning system receiver associated with each user device; and
determining, based on the location information, the user device that is closest to the control device, wherein the user device that is closest to the control device comprises the selected user device.

7. The method of claim 1, wherein the control device comprises a global positioning system receiver, and wherein determining the location of the control device comprises receiving location information from the global positioning system receiver.

8. The method of claim 1, wherein the step of identifying at least two user devices proximate to the control device comprises searching a database of user device locations for locations within a predetermined distance of the control device.

9. The method of claim 1, wherein the step of causing the control device to be paired with the selected user device comprises at least one of: mirroring an output of the user device on the control device, transmitting audio from the user device to the control device, transmitting video from the user device to the control device, and controlling user device with the control device.

10. The method of claim 1, wherein the step of causing the control device to be paired with the selected user device comprises the steps of:
requesting permission to allow the control device to control the selected user device; and
pairing the control device with the selected user device in response to receiving permission.

11. A system comprising:
a control device comprising a location device configured to determine a location of the control device;
a plurality of user devices; and
a server configured to communicate with the plurality of user devices and the control device, the server further configured to receive the location of the control device and determine a location of each of the plurality of user devices, wherein the control device transmits a request to control a user device to the server, wherein, in response to the request, the server causes one or more of the plurality of user devices to transmit a signal, wherein each of the one or more of the plurality of user devices transmits a signal at a different frequency from the others of the one or more of the plurality of user devices, and the server selects a user device to be paired with the control device based on the location of the control device, the location of the selected user device and a frequency of one of the respective signals.

12. The system of claim 11, wherein the control device further comprises:
a receiver configured to receive output from one or more of the plurality of user devices; and
a transmitter configured to transmit at least a portion of the output to the server, wherein the server identifies the output and, based on the identity of the output, identifies the user device generating the output.

13. The system of claim 12, wherein the output comprises a television program.

14. The system of claim 12, wherein the output comprises a tone, and wherein each of the plurality of user devices outputs a distinct tone.

15. The system of claim 14, wherein each tone comprises a frequency that is inaudible to humans.

16. The system of claim 11, wherein each of the plurality of user devices comprises a set top box.

17. The system of claim 11, wherein the location device is a global positioning system (GPS) receiver.

18. The system of claim 11, wherein the server allows the control device to control the selected user device.

19. The system of claim 18, wherein the server is further configured to identify an individual previously authorized to control the selected user device and transmit a request for permission to control the selected user device to the individual, and to allow the control device to control the selected user device after receiving an indication from the individual of consent to control.

20. A method comprising:
receiving a request to control a user device from a requestor device, the request comprising an indication of an identity of the requestor device and an indication of the location of the requestor device;
identifying a plurality of user devices proximate to the location of the requestor device; and
selecting, from the plurality of user devices, a user device to be paired with the requestor device, wherein the selecting step comprises:
causing a signal to be transmitted from each of the plurality of user devices,
identifying content from a portion of the signal,
determining which of the plurality of user devices is transmitting the identified content, and
accepting control signals from the requestor device.

* * * * *

UNITED STATES PATENT AND TRADEMARK OFFICE
CERTIFICATE OF CORRECTION

| | | |
|---|---|---|
| PATENT NO. | : 9,479,594 B2 | Page 1 of 1 |
| APPLICATION NO. | : 13/827575 | |
| DATED | : October 25, 2016 | |
| INVENTOR(S) | : Bryan Paluch et al. | |

It is certified that error appears in the above-identified patent and that said Letters Patent is hereby corrected as shown below:

In the Claims

In Column 17, Line 45, replace "the control device transmits" with -- the control device is configured to transmit --

In Column 17, Line 47, replace "the server causes" with -- the server is configured to cause --

In Column 17, Lines 49-50, replace "the plurality of user devices transmits" with -- the plurality of user devices are configured to transmit --

In Column 18, Line 2, replace "the server selects" with -- the server is configured to select --

In Column 18, Line 11, replace "the server identifies" with -- the server is configured to identify --

In Column 18, Lines 12-13, replace "identifies the user device" with -- to identify the user device --

In Column 18, Lines 17-18, replace "user devices outputs" with -- user devices is configured to output --

In Column 18, Line 25, replace "the server allows" with -- the server is configured to allow --

In Column 18, Line 29, replace "and transmit a request" with -- and to transmit a request --

Signed and Sealed this
Tenth Day of January, 2017

Michelle K. Lee
*Director of the United States Patent and Trademark Office*